April 13, 1954 W. T. MARCHMENT 2,675,543
DISPLAY, ADVERTISING, AND LIKE DEVICE
Filed April 28, 1952 5 Sheets-Sheet 1
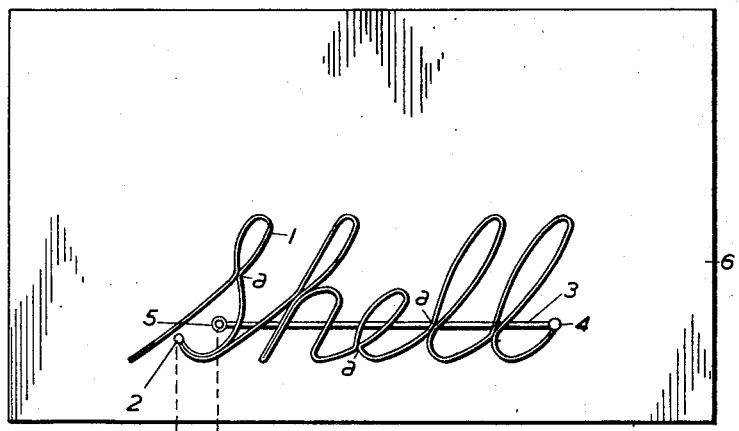
FIG.1.
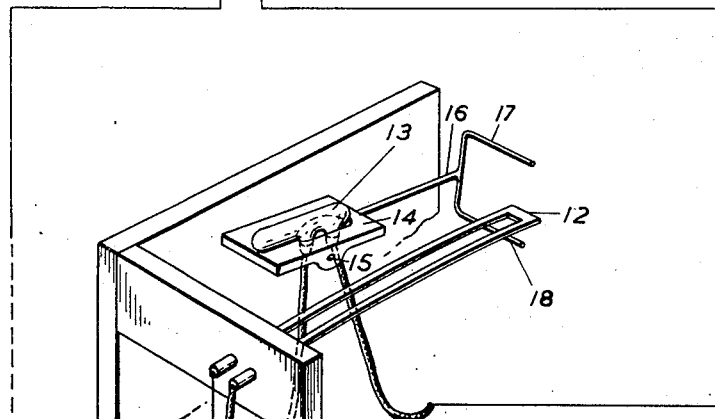
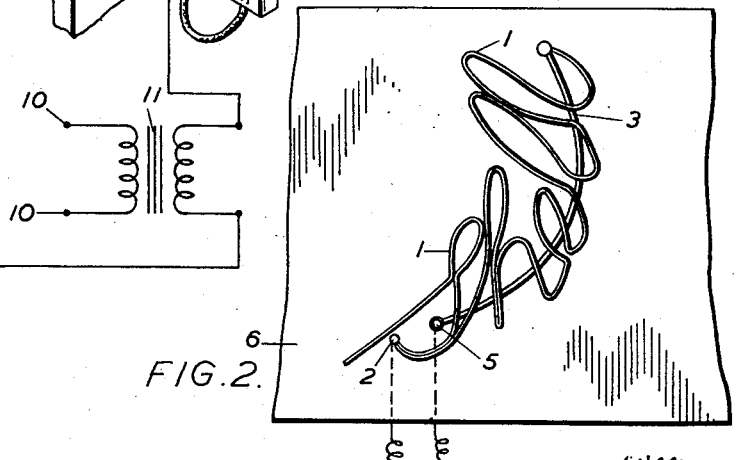
FIG.2.
Inventor
William T. Marchment
By Ralph B. Stewart
Attorney April 13, 1954     W. T. MARCHMENT     2,675,543
DISPLAY, ADVERTISING, AND LIKE DEVICE
Filed April 28, 1952     5 Sheets-Sheet 2
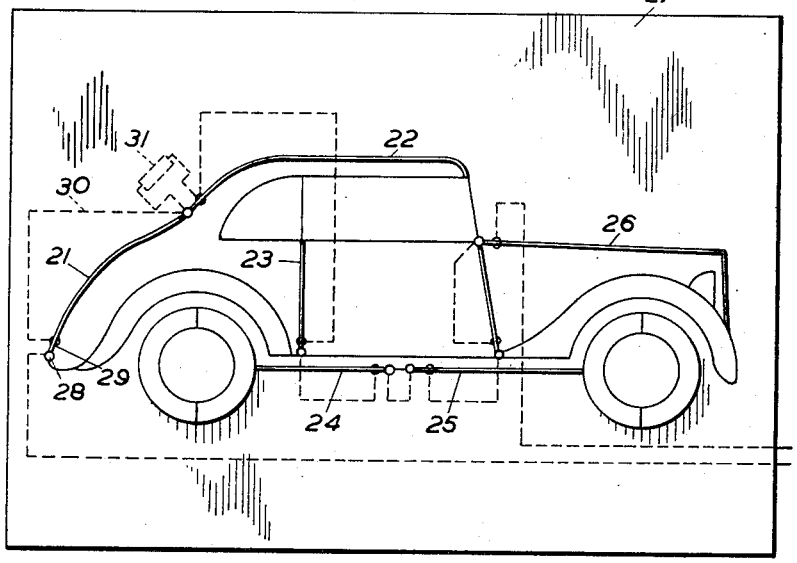
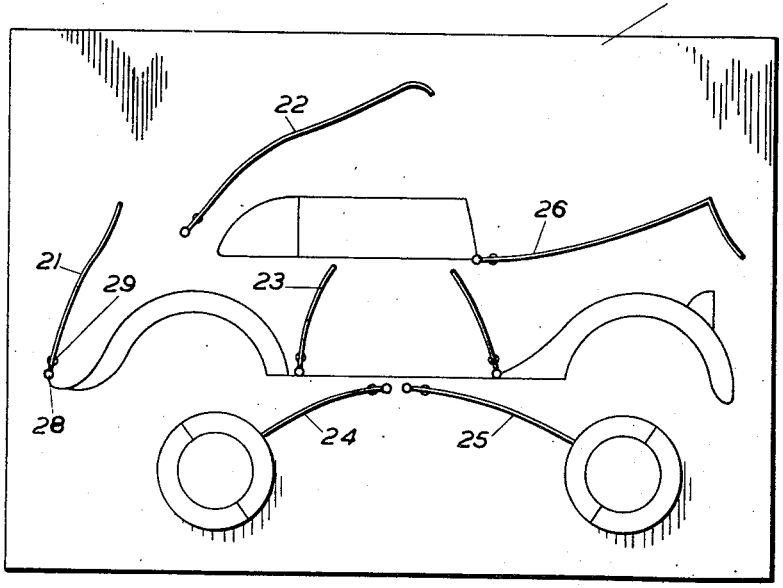
Inventor
William T. Marchment
By Ralph B. Stewart
Attorney Inventor
William T. Marchment
By Ralph B. Stewart
Attorney Inventor
William T. Marchment
By Ralph B. Stewart
Attorney April 13, 1954  W. T. MARCHMENT  2,675,543
DISPLAY, ADVERTISING, AND LIKE DEVICE
Filed April 28, 1952  5 Sheets-Sheet 5

Inventor
William T. Marchment
By Ralph B. Stewart
Attorney

Patented Apr. 13, 1954

2,675,543

UNITED STATES PATENT OFFICE 2,675,543

DISPLAY, ADVERTISING, AND LIKE DEVICE

William Thomas Marchment, Brandhoek,
Gerrards Cross, England

Application April 28, 1952, Serial No. 284,718

Claims priority, application Great Britain
May 1, 1951

12 Claims. (Cl. 340—334)

This invention relates to animated devices suitable for advertising and display purposes, and has as its object to provide the animation of such a device in a cheap and simple manner and with a very small amount of mechanism.

According to the invention a display sign depicted in outline has part at least of its outline made up of one or more bi-metallic strips supplied intermittently with electric current so as to bend and produce the desired movement of the outline. Preferably the outline is supported by a backboard or similar flat surface forming part of the device, but in some cases this can be dispensed with. Such a basic arrangement gives rise to a number of possibilities.

For example, a single bi-metallic strip or a number of such strips joined end-to-end may form the letters of a word or phrase. This is arranged to be legible when the strips are in the position which they take up when cold. As soon as the current begins to flow in the strips they start to heat up and gradually the complete sign curls into an illegible arrangement of strips. When the strips have curled to their maximum amount, the current is switched off and the strips return to their position in which they are legible.

In an alternative arrangement, a number of separate bi-metallic strips are each anchored at one end to the backboard and are arranged so as to each represent a portion of the outline when in the cold condition. As soon as the current is switched on the individual strips bend separately to break up the outline and render it unrecognisable. In order to simplify the electrical connections to the strips, each strip may be covered with insulating material and be doubled-back on itself so that its two free ends are close together, and in this way both of the connections may be made to it close to its point of anchorage.

In the simplest form of circuit arrangement, all the strips are connected together in series so that normally the same current would flow through each strip. If, however, it is desired to control the degree of bending of individual strips a shunting resistance may be connected in parallel with the strip so as to divert a proportion of the total current.

Although the whole of the outline may be constituted by the bi-metallic strips, it is also possible to alternate these with relatively flexible metallic conductors such as stout wires which are themselves deformed by the force exerted on them by the adjacent strips when heated.

The intermittent current supply to the strips may simply be provided by connecting a switch in the circuit which is operated by an additional bi-metallic strip which itself carries the operating current. Thus, as the strips constituting the outline bend so the strip operating the switch bends correspondingly, and when the desired amount of bending has occurred the switch is operated to break the circuit. As the strips return to their initial position again, the switch is again operated to reclose the circuit. It might be possible, however, for the strip operating the switch to be at a slightly different ambient temperature from the strips forming the outline so that the circuit would be interrupted either slightly before or slightly after the desired amount of bending had been attained. This difficulty may be overcome by the provision of a switch which is operated by the bending of one of the strips forming part of the outline. For this purpose a rigid member, itself forming part of the display sign, may be rocked about a pivot by the bending of the strips and this rocking motion may be transmitted through the backboard by means of a spindle, to a switch situated at the rear of the board.

In all the examples referred to so far, the bending of the strips will normally occur in a steady manner to provide a gradual transformation of the outline. If, however, a sudden transformation is desired a detent may be provided which restrains the movement of the strips and keeps the outline in its normal shape until the forces produced by the bending of the strips exceed a predetermined value sufficient to overcome the detent. When this occurs the outline is suddenly transformed to the shape corresponding to the heated condition of the strips. With this arrangement a separate switch may be dispensed with and the sudden movement of the strips may itself be used to carry out the switching operation.

A number of forms of display devices in accordance with the invention will now be described in more detail by way of example with reference to the accompanying drawings in which:

Figure 1 shows a continuous bi-metallic strip constituting a word with the switching arrangements shown in perspective;

Figure 2 is a view of the word shown in Figure 1 but with the strips bent to their heated shape;

Figure 3 shows an arrangement in which a number of separate strips anchored at their ends constitute the outline;

Figure 4 shows the arrangement of Figure 3 with the strips in their heated positions;

Figure 5:
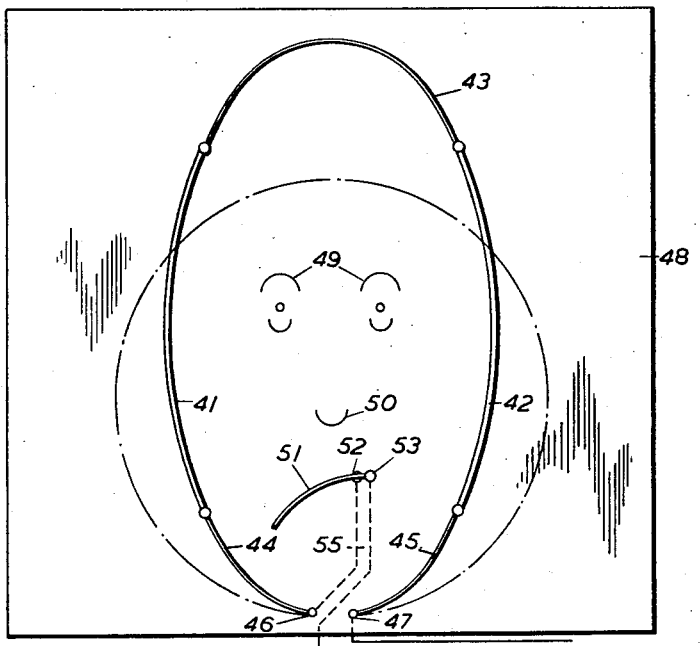
Figure 5 shows a face, the outline of which is made up of bi-metallic strips alternating with wire conductors.

Referring first to Figure 1, a bi-metallic strip 1 is shown bent to a shape constituting the letters of the word SHELL, the strip being bent to form the letters without recrossing itself; for example, as shown at the points $a$. The electric current is supplied to the strip 1 at 2, and the circuit is completed by a return strip 3 connected to the strip 1 at 4 and connected to the supply circuit at 5. The strips 1 and 3 are anchored to a backboard 6 also at the points 2 and 5 where the electrical connections are made. The arrangement of the strips 1 and 3 are such that when heated they both bend in the same direction, as shown in Figure 2. Both the individual portions of the strip 1 bend so as to distort the separate letters, while the general shape of the word as a whole, is governed by the bending of the strip 3.

The supply is taken from alternating current mains 10 by way of a transformer 11, and passes firstly, through a bi-metallic strip 12 which is doubled-back on itself, and then through a mercury switch 13 to the strips 1 and 3 on the front of the board 6. The circuit components are arranged behind the board 6 so as to be invisible. The mercury switch 13 is supported in a bracket 14 pivoted at 15 and provided with an arm 16 with a pair of spaced projections 17 and 18 between which the bi-metallic strip 12 plays. As shown in Figure 1, the bi-metallic strip 12 is cold and bears against the lower projection 18 rocking the bracket 14 in a clockwise direction to complete the circuit through the mercury switch 13. As the current flows through the bi-metallic strip 12 it curls upwardly away from the lower projection 18, but since the bracket 14 is overbalanced the circuit remains closed until the strip 12 engages the upper projection 17 and rocks the bracket 14 in an anticlockwise direction to open the circuit. As soon as the circuit has opened the strip 12 starts to straighten out again and leaves the upper projection 17. Again the bracket 14 remains in this position with the circuit opened until the strip 12 has straightened out sufficiently to engage the projection 18 reclosing the circuit and restarting the cycle of operations which thus proceeds automatically.

In the arrangement of Figure 3, a number of separate bi-metallic strips 21, 22, 23, 24, 25 and 26 in combination with fixed wires, together make up the outline of a motorcar. Each strip is covered with insulating material and is doubled-back on itself so that the free ends lie close together. Each strip is then anchored to a backboard 27 by a pair of electrical terminals shown as 28 and 29 in the case of the strip 21, which thus serves the double purpose of an anchorage and an electrical connection. The strips are connected in series with one another in the order of their reference numerals, by connections indicated by dotted lines 30 and located behind the backboard so as to be invisible. The electrical supply is interrupted intermittently by means of a switching arrangement of the form shown in Figure 1, and when the current is supplied to the strips each one bends individually into the position shown in Figure 4, thus breaking up the outline of the car and rendering it virtually unrecognisable. In order to avoid excessive bending of the strip 22, a resistance 31 shown in dotted lines in Figure 3, is connected in parallel with it so as to divert a proportion of the total current from the strip 22. In this way the bending is restricted to the amount shown in Figure 4. Similar resistances can, if need be, be arranged to shunt in any of the other strips. Under the control of the intermittent electric current the car, therefore, is constantly broken up and reassembled and attracts the attention of passers-by.

Figure 6:
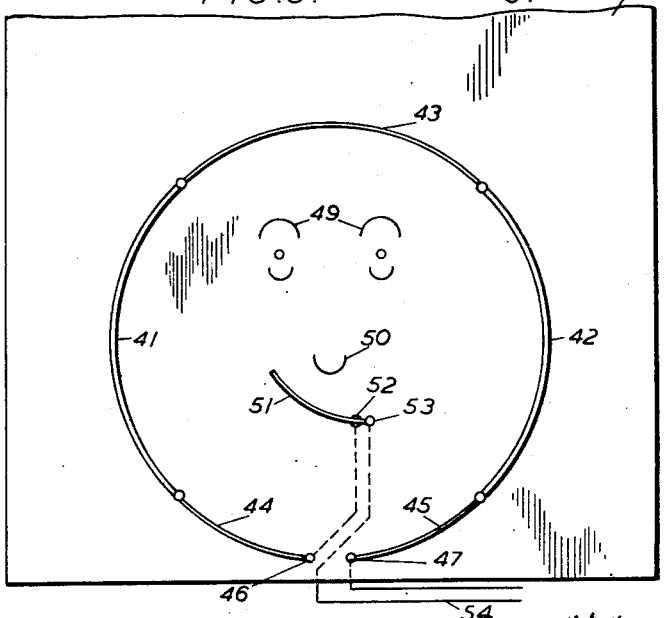
Figure 6 shows the face of Figure 5 with the strips in their heated condition.

In the arrangement of Figures 5 and 6 a pair of bi-metallic strips 41 and 42 constitute part of the outline of a face. The outline is made up of a stout wire 43 connecting the upper ends of the strips 41 and 42, and further lengths of wire 44 and 45 connecting the lower ends of the strips 41 and 42 to terminals 46 and 47 respectively. In addition to providing the electrical connections, these terminals also serve to anchor the complete outline to a backboard 48. The eyes 49 and the nose 50 are made up of pieces of wire attached to the backboard 48, while the mouth 51 is made up of a bi-metallic strip doubled-back on itself after the manner of the strips shown in Figures 3 and 4. The strip is connected to the backboard 48 by terminals 52 and 53, and is connected in series circuit with the strips 41 and 42. The supply is made by way of leads 54, one of which is connected to the terminal 53, the terminal 52 being connected by a wire 55 to the terminal 46. When the current is switched on the strips 41 and 42 bend into the shape shown in Figure 6, thus exerting a force on the wires 43, 44 and 45 causing these also to bend so that the complete outline is circular. The effect of the current on the mouth 51 is to cause it to bend upwardly from a downward curve into an upward curve so that the expression of the face is changed. Again the current supply is interrupted intermittently by a form of switch as shown in Figure 1, and the constantly changing expression of the face again serves to attract attention.

Figure 7:
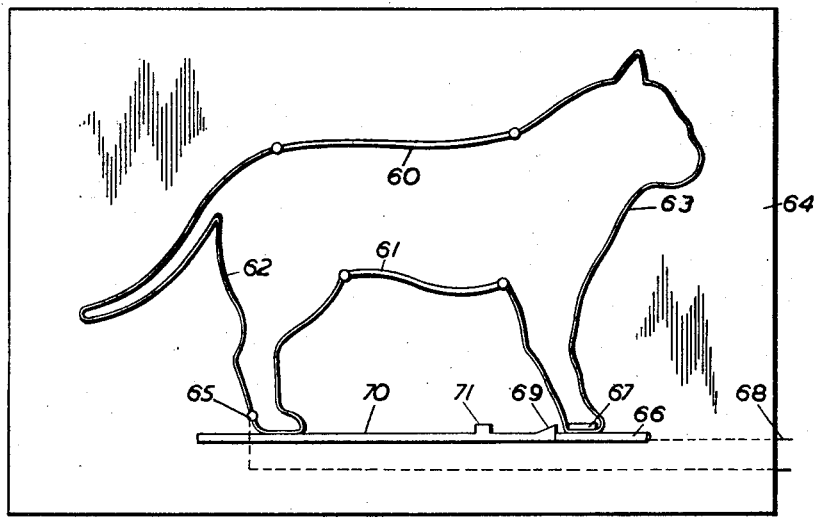
Figure 7 shows bi-metallic strips forming part of the outline of a cat, movement of which is restrained by a detent.

In the arrangement shown in Figure 7, a pair of bi-metallic strips 60 and 61 form the upper and lower sides of the back of a cat, the remainder of the outline being formed of a relatively rigid conductor made in two halves, 62 and 63. The outline as a whole, is anchored to a backboard 64 by a terminal 65, which also makes one of the electrical connections. The other of the electrical connections is made between a metal plate 66 and a metal shoe 67 connected to the wire 63 and forming the forefeet of the cat. The supply leads 68 are thus connected to the terminal 65 and the plate 66. The outline of the cat thus constitutes two parallel circuits, one passing through the strip 60 and the other passing through the strip 61 between the terminal 65 and the plate 66. In the position shown in Figure 7, the circuit is complete, and under the action of the current the strips 60 and 61 start to bend upwardly. This tends to draw the forefeet of the cat inwardly, but the movement is restricted by a detent in the form of a stop 69 made of insulating material and formed at the end of a strip 70 on which the cat appears to stand. As the strips 60 and 61 continue to bend the force exerted on the stop 69 becomes greater until a point is reached when the forefeet move suddenly over the stop and the cat arches its back to the position shown in Figure 9 with a sudden movement. Further movement is then prevented by a second stop 71 also formed in strip 70. Movement of the shoe 67 from the plate 66 breaks the circuit, and the strips 60 and 61 then begin to cool down. The stop 69 is shaped with a slope on its rear side so that the shoe 67 rides easily over it and then drops on to the plate 66 to reclose the circuit and restart the cycle of operations.

Figure 8:
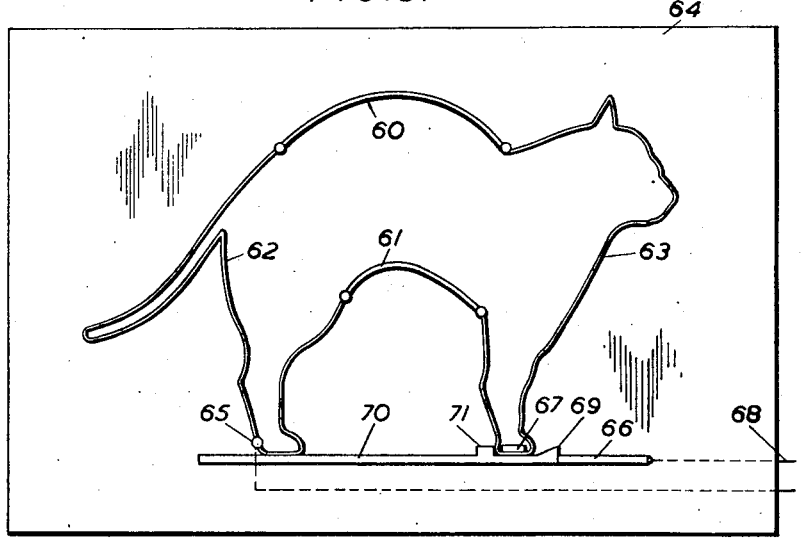
Figure 8 shows the cat of Figure 7 with the strips in their heated condition.
Figure 9:
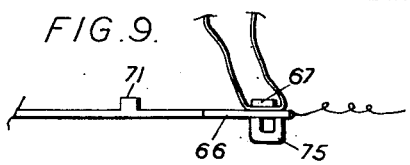
Figure 9 is a detail view showing parts of Figures 7 and 8 employing a magnetic detent.

As shown in Figures 7 and 8, the detent is a purely mechanical one provided by the latching action of the stop 69. As an alternative to this a magnetic detent may be provided as shown in Figure 9. In this case a small permanent magnet 75 is mounted beneath the plate 66 and exerts an attraction on the shoe 67 which is made of soft iron for the purpose. When strips 60 and 61 first begin to bend the movement is resisted by the attraction of the magnet 75 and the shoe 67, but when the force becomes too great the pull of the magnet is overcome and the forefeet of the cat move to the left until they come into engagement with the stop 71. This breaks the circuit and the strips 60 and 61 then begin to straighten up again. This moves the forefeet to the right and as soon as the shoe 67 comes within the attractive range of the magnet 75 it is pulled back into its original position as shown in Figure 9, and the cycle is repeated.

Figure 10:
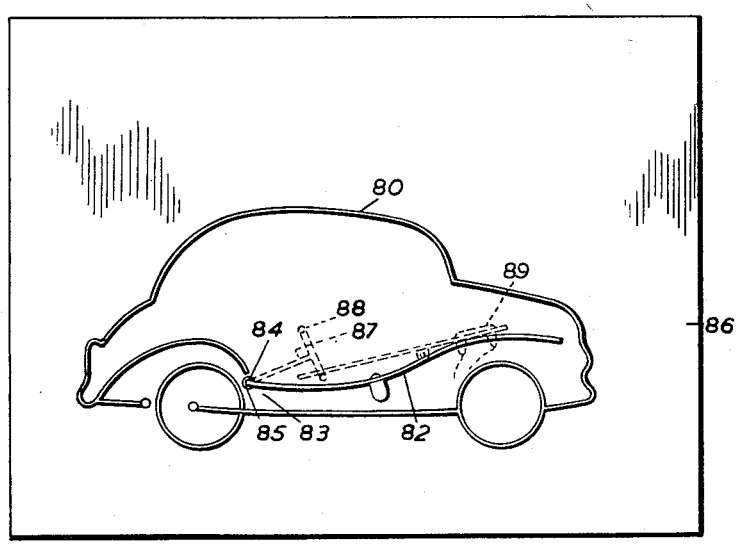
Figure 10 shows a number of bi-metallic strips making up the outline of a car themselves operating a switch.
Figure 11:
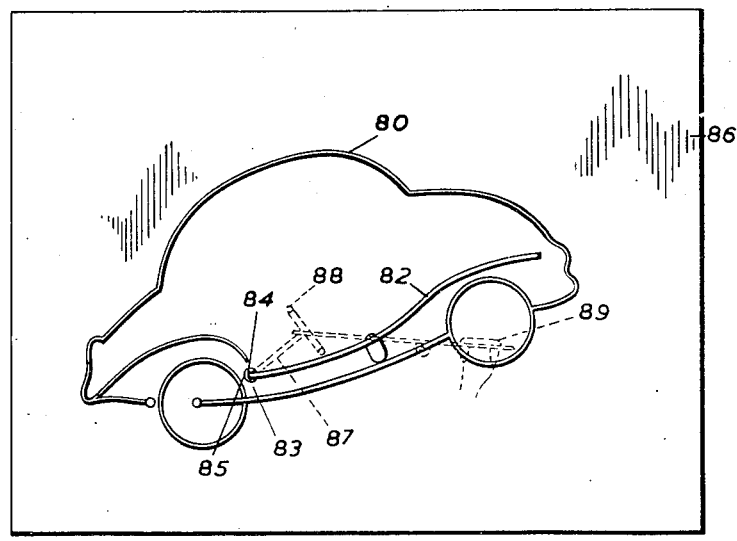
Figure 11 shows the car of Figure 10 with the strips in their heated condition.

In the arrangement of Figures 10 and 11, a number of bi-metallic strips make up the outline of the car which curls upwardly into the position of Figure 11 when heated, in much the same way as the word of Figures 1 and 2. In this case, however, the motion of the car itself serves to operate the switch. In addition to the main bi-metallic strip 80, a fairly rigid wire 82 forms part of the outline of the mudguard. When the car moves upwardly to the position of Figure 11, this wire does not bend but gradually rocks upwardly. For this purpose it is pivoted at 83 and a short spindle 84 passes through a hole 85 in the backboard 86. At the rear of the board the spindle 85 carries an arm 87, which cooperates with a forked arm 88 to operate a switch 89 in the same way as shown in Figure 1. Thus, when the car reaches the position of Figure 11 the arm operates the switch to interrupt the current. When the car returns to the position of Figure 10 the arm remakes the circuit and the operation is repeated.

In all of the examples just described, the bending of one or more bi-metallic strips is used to produce an intermittent motion of the display sign which may either be gradual or sudden. The amount of mechanism involved in each case is small and is moreover extremely simple. The bi-metallic strips have a very long life, and are strong and robust in operation. A number of different combinations of metals may be used, but a strip consisting of nickel and iron is found to give particularly good results since it produces a large degree of bending for a comparatively small rise of temperature.

The movements of the signs attract the attention of passers-by so that an effective advertisement is produced. In order to make the signs more attractive, however, they may be painted with fluorescent paint. For this purpose each of the strips is enclosed in a sheath of a flexible heat-resisting and insulating material such, for example, as woven glass silk, and these sheaths may then be coated with the paint. In order to heighten the effect of the fluorescent paint, the sign as a whole may be energised by means of ultra-violet light which causes the paint to glow.

I claim:

1. A display device comprising in combination a display sign depicted in outline and including at least one bi-metallic strip, said strip constituting at least part of said outline, support means for said strip, current supply means for said strip and means for intermittently interrupting the current supply to said strip, whereby said strip is alternately heated and cooled so as to produce corresponding movements of said outline.

2. A display device according to claim 1, in which said support means comprise a backboard and means anchoring said strip to said backboard.

3. A display device according to claim 1, in which said strip is continuous and forms a sequence of letters.

4. A display device comprising in combination a flat support, a plurality of bi-metallic strips, means anchoring each of said strips to said support, said strips together constituting at least part of the outline of a display design, current supply means for said strips and means for intermittently interrupting the current supply to said strips whereby said strips are alternately heated and cooled so as to produce corresponding movements of said outline.

5. A display device according to claim 4, and comprising in addition an insulated covering for each of said bimetallic strips, each of said strips being doubled back on itself and an electrical connection to the adjacent ends of each of said strips.

6. A display device according to claim 5, and comprising circuit means connecting all said bimetallic strips in series and shunting means connected in parallel with at least one of said bi-metallic strips, said shunting means serving to divert a proportion of the total current from said shunted strip, thus reducing the amount of its bending.

7. A display device comprising in combination, a display sign depicted in outline and including a plurality of bimetallic strips and a plurality of relatively flexible bimetallic conductors, said strips and said conductors alternating to constitute said outline, support means for said display sign, current supply means for said strips and said conductors connected in series and means for intermittently interrupting the current supply.

8. A display device according to claim 7, in which the means for intermittently interrupting the current supply comprises a switch and a further bimetallic strip controlling said switch, said further bimetallic strip itself carrying the said current.

9. A display or advertising device according to claim 7, in which the means for intermittently interrupting the current supply comprises a switch and means operated by the bending of said bimetallic strips for controlling said switch.

10. A display device comprising in combination, a display sign depicted in outline and including at least one bimetallic strip, said strip constituting at least part of said outline, support means for said strip, current supply means for said strip, means for intermittently interrupting the current supply to said strip and a detent for producing sudden movements of said strip under the action of alternate heating and cooling produced by said current.

11. A display device according to claim 10, in which said detent comprises a soft iron armature connected to said outline and a permanent magnet connected to said supporting surface.

12. A display device according to claim 11 and comprising switch means operated by said detent for interrupting said current.

References Cited in the file of this patent
UNITED STATES PATENTS

| Number | Name | Date |
|---|---|---|
| 1,258,368 | Smith | Mar. 5, 1918 |
| 1,822,098 | Huntress | Sept. 8, 1931 |
| 1,873,251 | Barclay | Aug. 23, 1932 |
| 2,555,882 | Guajardo | June 5, 1951 |